United States Patent Office 2,967,838
Patented Jan. 10, 1961

2,967,838

NEW SYNTHETIC DRYING OILS

Alexander M. Partansky, Concord, Calif., assignor to The Dow Chemical Company, Midland, Mich., a corporation of Delaware No Drawing. Filed Nov. 15, 1954, Ser. No. 469,019

4 Claims. (Cl. 260—19)

This invention relates to a new synthetic drying ester, of oily consistency, useful in coatings in the manner in which conventional oleoresinous varnishes are used, but superior to them in properties and performance.

The traditional varnish is a solution of a natural or synthetic resin in a drying oil. It is most commonly prepared by cooking together the resin and an unsaturated glyceride, or "drying oil," until a uniform solution is obtained which has more body and will form harder films on drying than the original oil. In the interests of uniformity of composition and improved performance of the coating, it would be preferable to prepare a varnish-like vehicle in which the bodying and hardening substance is part of the same molecule as the unsaturated fatty acid chains which "dry" upon reaction with atmospheric oxygen, instead of a mere solution of the hardening resin in the drying oil.

One approach to a solution to this problem is described by De Groote and Keiser in U.S. Patent No. 2,610,955. The material described in that patent is a drying fatty acid ester of the hydroxyalkyl ether of a novolak made from an aldehyde and a difunctional phenol having a hydrocarbon substitutent of from 4 to 18 carbon atoms. These are useful coating materials, but the softening and solubilizing effect of the large hydrocarbon substituents makes them more subject to damaging attack by solvents and chemicals than is desirable in many fields of use. The same patent, however, insists that the series of reactions leadings to the formation of a useful synthetic drying ester cannot be carried out unless the phenol-aldehyde resin employed is one made almost exclusively from the described difunctional, hydrocarbon-substituted phenols, essentially free from trifunctional phenols such as the common phenol, $C_6H_5OH$. Specifically, it is pointed out that more than trace amounts of trifunctional phenol in the phenol-aldehyde resin lead to difficulties in the oxyalkylation reaction so that the oxyalkylated derivatives are not useful in making drying coatings by reaction with drying oil acids. A small amount of trifunctional phenol in the phenol-aldehyde resin is said to cause a rubbery product to be formed during oxyalkylation, and this product becomes extremely insoluble and is no longer considered useful. As a measure of the limiting amount of trifunctional phenol which can be tolerated, De Groote indicates that trouble has been encountered in making solvent-soluble resin products by oxyalkylation when the phenol aldehyde resin contained as little as 1 per of such phenol. The oxyalkylated difunctional phenol-aldehyde resins described by De Groote react very slowly with drying oil acids, sometimes requiring 15 to 24 hours before the acid number of the cook is reduced to a practical value in the range from 3 to 10.

Because of the greater hardness inherent in phenol-formaldehyde resins made from trifunctional phenols as compared with those made from difunctional phenols, it is desirable to produce a useful synthetic varnish in which the resin portion of the molecule is based primarily on a trifunctional phenol novolak. Specifically, it is desirable to produce such a varnish from the reaction product of ethylene oxide with a novolak made from formaldehyde, or equivalent methylene bridge-forming agent, and the common trifunctional phenol, $C_6H_5OH$. Because of its low molecular weight as compared with the hydrocarbon substituted difunctional phenols, common phenol gives oxyalkylated resinous products with relatively low equivalent weight per reactive hydroxyl group present.

Novolaks and resols have been made from trifunctional common phenol for many years. It has been suggested by Balle, in U.S. Patent No. 2,060,410, to react novolaks or resols with alkylene oxides to form poly(hydroxyalkyl) ethers of the phenol-aldehyde condensates. The ether products obtained and described by Balle are soluble in such hydrocarbons as benzene and turpentine, as well as in alcohol. It has been found that the novolaks and resols which give hydroxyalkyl ethers which are soluble in hydrocarbons are of too low molecular weight to give good varnishes when such hydroxyalkyl ethers are esterified with drying oil acids. This has been shown by the present inventor and another in copending application Serial No. 405,026, filed January 19, 1954. In that application it is shown that the poly(hydroxyalkyl) ethers of novolaks from common phenol and formaldehyde which can be converted by esterification into useful varnishes have from 4 to 10 phenol units per molecule, etherified with from 0.85 to 1.2 mols of ethylene or propylene oxide per phenolic unit, and that these useful poly(hydroxyalkyl) ethers are immiscible with drying oils, insoluble in aromatic, aliphatic and terpene hydrocarbons and in water and aqueous alkalies, but soluble in such other solvents as ethanol, acetone, ethyl acetate or dioxane. Two of the several ways in which novolaks can be made having the required molecular weight, suitable for use in subsequent etherification and esterification reactions to produce useful varnishes, are described by the present inventor and others in copending applications Serial Nos. 382,851, now U.S. Patent No. 2,838,473, and 382,852, now abandoned, both filed September 28, 1953. Other procedures for making phenol-aldehyde condensates of the required molecular weight are known.

For convenience, the hydroxyalkyl ethers of phenol-aldehyde condensates are referred to hereinafter as "resinous polyalcohols" or simply as "polyalcohols."

The principal object of this invention is to provide a synthetic drying oil of superior properties which is the esterification product of a drying oil acid and a resinous polyalcohol made from a trifunctional phenol novolak. A further object is to provide such an oil which is miscible with common oleoresinous vehicles and which can be pigmented to form compositions suitable for use as air-drying enamels or as baking enamels. Other objects are to provide new drying and bodying constituents for oleoresinous coatings. A special object is the provision of such new synthetic oily vehicles which may be cooked in a short time to low acid numbers and which may be bodied by further cooking without gellation.

Basically, the synthetic drying oil of the invention is an esterification product of (1) an oxyalkylated thermoplastic phenol-formaldehyde condensate having from 4 to 10 phenolic hydroxyls per molecule, at least half of the phenolic constituents of the condensate being the common trifunctional phenol, $C_6H_5OH$, there being an average of from 0.85 to 1.2 oxyalkylene groups per phenolic nucleus, the oxyalkylene groups being those of the class consisting of ethylene and propylene oxides etherified principally with the phenolic hydroxyls of the condensate, said oxyalkylated product being one which is insoluble in aromatic (and terpene) hydrocarbons, and (2) carboxylic acids in amount to provide from 0.1 to 1.0 and preferably 0.35 to 0.9 carboxyl group per alcoholic hydroxyl of said oxyalkylated condensate, the preponderant amount (at least 60 percent) of such acids being drying oil fatty acids; said esterification product having preferably an acid number under 10.

The trifunctional phenol which should constitute at least half of the phenolic constituents of the novolak is preferably common phenol, $C_6H_5OH$, both for economic reasons and because of the superior properties which it gives to the final synthetic drying oil. Other trifunctional phenols which may be used, usually somewhat less advantageously, and which may be all or part of the trifunctional phenolic constituents of the condensate, include the meta-substituted phenols whose substituents are inert to alkylene oxides and to carboxylic acids. These include the meta-hydrocarbon substituted monohydric phenols, such as meta-cresol, and the corresponding meta-halogenated compounds. While some trifunctional polyhydric phenols may be used, such as resorcinol or phloroglucinol, these should generally constitute a minor proportion, e.g., less than 10 percent of the trifunctional phenol. If first etherified to leave only one phenolic hydroxyl, the trifunctional polyhydric phenols may be used in any proportion relative to other phenols in the phenol-aldehyde condensate. Examples of such partial ethers are resorcinol monomethyl ether and phloroglucinol dimethyl ether.

The phenol-aldehyde condensates whose alkoxylated products form useful polyalcohol components of the new synthetic drying oils may contain difunctional monohydric phenols in proportions to furnish up to half of the phenolic nuclei in the condensate. The difunctional phenols most useful are the ortho- and para-hydrocarbon- or halogen-substituted phenols. Hydrocarbon substituents in such phenols may contain from 1 to 18 carbon atoms. It should be noted, however, that, as the hydrocarbon substituents increase in size, less of the difunctional phenol can occur in the phenol-aldehyde condensate if the resinous polyalcohol producible by reaction with ethylene or propylene oxides is to meet the requirement of insolubility in hydrocarbons. For the preparation of the best synthetic oils, the proportion of difunctional phenol, if any, in the phenol-aldehyde condensate should be kept small, especially when high viscosity coatings are desired, as large amounts of difunctional phenol lead to low viscosity products. This becomes important in proprietary "varnishes" sold in small lots to individuals for home use, as these should have high apparent viscosity, but is less important in industrial coatings which are rated primarily on performance rather than viscosity.

The resinous polyhydric alcohols which are esterified to form the new drying oils are made by an alkaline catalyzed reaction between one of the defined phenol-formaldehyde condensates and ethylene oxide or propylene oxide. The ratio of such oxide reacted with the condensate should be in the range from 0.85 to 1.2 mols of the oxide for each phenolic hydroxyl of the condensate. Higher and lower proportions both affect the solubility and chemical resistance characteristics of the ultimate synthetic drying oil adversely. Ethylene oxide gives polyalcohols which form more rugged coatings, i.e., more chemically inert ones, than does propylene oxide. Mixtures of ethylene and propylene oxides may be used to form highly useful polyalcohols suitable for making the new oils. The objective is to employ a resinous polyalcohol in which nearly all of the phenolic hydroxyls are etherified and in which the etherifying groups are mostly hydroxy-monoalkylene groups, such as

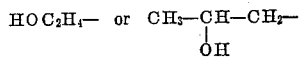

rather than hydroxy-polyalkyleneoxy groups, such as $HO—(C_2H_4O)_n—$. The shorter the average chain length of the etherifying group in these oxyalkylated products, the better suited are the polyalcohols for the present purpose.

Useful synthetic oils are made by cooking the described polyalcohols with drying oil fatty acids at temperatures usually near 235°–240° C. for the hydroxyethyl compounds and near 240°–245° C. for the hydroxypropyl compounds. The amount of acid used should be enough to yield an oil-soluble ester. This result may be obtained by esterifying as little as 0.1 of the hydroxyl groups. However, the amount of acid may be enough to esterify nearly all of the alcoholic hydroxyls of the resinous polyalcohol. The preponderant proportion of the acids used should be those monomeric acids which are obtained by saponification of drying oils or semidrying oils. Relatively small amounts of dicarboxylic acids or of their anhydrides, such as phthalic acid or its isomers, succinic acid, or maleic anhydride, or dimeric drying oil acids, may be added to the cook to effect part of the esterification and to increase the viscosity of the product. Such materials should not exceed 40 percent of the carboxyl values present. They generally will not represent in excess of 20 percent of the number of esterifying carboxyl groups present in the total amount of acid used, and, if used at all, the dicarboxylic compounds will preferably be held to less than 10 percent of the total carboxylic groups employed. The esterification of the recited class of polyalcohol proceeds rapidly, and acid numbers under 10 are reached in from 2 to less than 10 hours in most cases. Because of the stability of the composition, and its freedom from gelling tendencies, the ester product can be cooked safely for longer periods if it is desired to effect some heat bodying after the esterification is essentially complete. The time-viscosity curve, obtainable from viscosity measurements during the cook, does not turn sharply toward a position parallel to the viscosity axis, as in the case of materials which gel during cooking. This is very important to the varnish maker, providing him with greater latitude in his cooking schedules.

The ester products may be used without further modification as clear varnish-like coatings, or they may be blended or cooked with such standard coating constituents as drying oils, alkyd or phenolic or other resins, and pigments may be incorporated in the compositions. Conventional driers are usually added, to shorten the drying time. Such compositions may be used as air-drying coatings, or as baking finishes.

The following examples illustrate not only the new drying oils and their preparation but also various ways in which the phenol-formaldehyde condensate and its oxyalkylated derivatives may be prepared in a form useful to the invention.

EXAMPLE 1

A novolak was prepared by heating together at reflux temperature a mixture of 1200 g. (12.8 mols) phenol
825 g. (10.2 mols) 37% formalin
16.3 g. 12 normal hydrochloric acid
190 g. water Heating was continued for 3.5 hours. The mixture was neutralized, washed and dehydrated in conventional manner. There was recovered 1187 grams of a novolak melting at 92° C. and having a molecular weight of 685 (6.57 phenol units per molecule). One thousand grams of this novolak was dissolved in 500 grams of a chemically inert solvent, and mixed with 6 grams of a 50% sodium hydroxide solution. This mixture was sealed in a pressure vessel and was heated to 162° C. External heating was discontinued, and ethylene oxide was introduced slowly into the mixture at a rate to keep the internal temperature in the range from 160° to 225° C. Most of the time, the temperature was kept below 200° C. A total of 435 grams of ethylene oxide (1.03 mols per phenolic hydroxyl in the novolak) was introduced in the course of 3 hours. A temperature above 160° C. but not over 225° C. was maintained for a total of 3.5 hours. The vessel was cooled, the solution of polyalcohol was neutralized, washed, and freed from solvent. There was obtained practically a quantitative yield of 1413 grams of polyalcohol melting at 63° C. and having an equivalent weight of 147.2 per alcoholic hydroxyl group, indicating over 99 percent of the theoretical etherification.

An ester was prepared by cooking together 73.6 g. of the polyalcohol
112.0 g. of linseed oil fatty acids
10 ml. of xylene under a nitrogen atmosphere for 4.5 hours at about 235° C. The amount of fatty acid used was 0.8 of the amount theoretically equivalent to the alcohol groups in the polyalcohol. The acid number of the cook was then at a value of 4.7, and the viscosity of a 70% solution of the ester in xylene (at room temperature) was 125 centipoises. A 70% solution in mineral spirits had a Gardner-Holdt viscosity of M. Films of the ester dried rapidly in air to give alkali-resistant, tough coatings.

The polyalcohol of this example was insoluble in benzene, toluene, xylene, turpentine, naphtha, water and 5% aqueous alkali, and was soluble in acetone.

EXAMPLE 2

There was charged into a pressure vessel 8500 g. (90.4 mols) phenol
5940 g. (73.3 mols) 37% formalin
4750 g. water
170 g. oxalic acid crystals The mixture was heated to about 90° C., whereupon an exothermic reaction started and external heating was discontinued. The temperature rose to 181° C. and the mass began to cool by radiation. When the temperature had dropped to 120° C. (total time from start of reaction, 100 minutes), external cooling was applied. The novolak was neutralized, washed, dehydrated and found to melt at 105° C. and to have a molecular weight of 764 (7.31 phenol units per molecule). To 600 grams of this novolak was added 430 grams of an inert solvent and 3.6 grams of 50% sodium hydroxide solution. Etherification was effected at about 200° C. with ethylene oxide until 277 grams had been added. The total reaction time above 160° C. was 2 hours and the maximum temperature attained was 230° C., and this only for a brief period. There was obtained 877 grams of polyalcohol melting at 64° C. and having an equivalent weight of 152 grams per alcoholic hydroxyl. This polyalcohol was insoluble in drying oils, aromatic and aliphatic hydrocarbons, turpentine, water and aqueous alkalies, but dissolved in acetone. When 100 grams of the polyalcohol was cooked at 235° C. for 3.5 hours with 147 grams of linseed oil fatty acids, a gel free oil was obtained having an acid number of 4.7 and whose 70% solution in xylene had a viscosity of 150 centipoises at room temperature. A 70% solution in mineral spirits had a Gardner-Holdt viscosity of W. The oil, when spread on a surface as a coating, dried rapidly to form a tough, slightly amber film.

EXAMPLE 3

A series of resinous polyalcohols was made and from them several varnishes were prepared and tested in comparison with one another and with representative commercial varnishes. The tests will be described and the results of the tests will be tabulated, following a brief description of the preparation of the polyalcohols.

(A) 100 parts of novolak, molecular weight 810, prepared as in Example 2, were dissolved in 60 parts of dioxane, and there was added 0.3 part of sodium hydroxide dissolved in 0.3 part of water. The mixture was heated to 140° C. in a pressure vessel, and 1.05 mols of ethylene oxide for each mol of phenolic hydroxyl was added slowly. Heating was continued until the pressure dropped to that of the dioxane. The vessel was cooled, opened and the contents neutralized with citric acid. The dioxane was distilled off under reduced pressure. The resulting resinous polyalcohol had a molecular weight of 1295, a melting point of 86° C., and the equivalent weight per alcoholic hydroxyl as determined by esterification of a sample with an excess of soya oil fatty acids was 144 grams.

(B) A novolak, prepared as in Example 2, but having a molecular weight of 748, was etherified in the manner described in (A), using propylene oxide. The polyalcohol had a molecular weight of 1194, a melting point of 75° C., and a hydroxyl equivalent of 160.2 grams.

(C) The resinous polyalcohol was made exactly as in (A) but from a slightly lower molecular weight novolak. The polyalcohol had a molecular weight of 1215, a melting point of 86° C., and hydroxyl equivalent weight of 151 grams.

(D) A novolak was prepared by refluxing 16 gram mols of phenol, 13.2 mols of 37 percent formalin, 171 ml. of 12 normal hydrochloric acid and 720 ml. of additional water, with stirring, for one hour. The mixture was neutralized with sodium hydroxide, the resin layer was washed free of salt and was heated under vacuum to remove unreacted phenol and other readily volatile matter. The novolak had a molecular weight of 560 and a melting point of 91° C. A 715 gram portion of this novolak was dissolved in 360 grams of dioxane and 4.4 grams of 50 percent aqueous caustic soda was added. This mixture was etherified with propylene oxide at 200° C. in the manner previously described. There was obtained 990 grams of resinous polyalcohol having a molecular weight of 870, a melting point of 70° C., and a hydroxyl equivalent weight of 186 grams.

The four polyalcohols were esterified as indicated in Table 1, and the resulting varnishes were given the following tests, with the data appearing in Table 2.

Films were cast, at 3 mils wet thickness, on glass slides using 50 percent solutions of the synthetic oil in xylene. The time required by the film to dry to a tack-free condition was noted. The hardness of the dried film was determined, either by means of the Sward Rocker test or by the pencil grade required to mark the film. Slides carrying the dried coatings were immersed in 2 percent aqueous sodium hydroxide at room temperature, and the film condition was noted periodically. Other such coated slides were immersed in cold water for 2 weeks. Similar tests were made to determine the hardness, alkali and water resistance of similarly deposited films of the varnish which were baked at 150° C. for 30 minutes.

Weather resistance was determined on blocks of vertical grain hemlock carrying 3 coats of the test varnish and exposed at an angle of 45° to the ground, facing south, for 12 months to the weather at Pittsburg, Calif. The glossiness of the coatings was measured (by percent light reflectance) before and after the outdoor exposure period, and percent retention of gloss was computed.

Tin cans were coated internally with a 50 percent solution of the varnish in xylene. Excess liquid was drained out, the linings were air dried overnight, and the cans were baked 30 minutes at 150° C. They were then filled with and immersed in boiling water for 48 hours, and the condition of the coating was noted.

Four of the best obtainable commercial resin-in-oil spar varnishes, recommended for general purpose and outdoor use, were tested in comparison with the new coatings. These are designated in Table 2 by Roman numerals.

It is noted that in these tests none of the new synthetic drying oils of this invention were specially compounded or reinforced with such materials as resins, pigments, or added oils to adapt them for special uses, but that they were used in unmodified form. It is known that the new oils can be adapted for special uses by modification according to standard varnish formulation practices. Thus, vehicle viscosity and dried film hardness can both be enhanced by dissolving in the new oils the conventional difunctional phenol novolaks, wood rosin, ester gum or other bodying and hardening resins.

Blanks in the tables indicate no determination was made.

It is noted from the foregoing data that the new esters have drying rates of the same order as the commercial resin-reinforced oil varnishes. These rates are much faster than those for the drying oils alone, yet the new compounds are oils, differing from normal drying oils by having a resinous alcohol nucleus instead of a simple glycerol nucleus. The hardness of the new compounds varied somewhat, depending on the "oil length" and being somewhat lower for the propylene than for the ethylene containing compounds. Without special compounding

*Table 1*

| Resinous Polyalcohol | | Fatty Acids for Esterification | | | | Ave. Temp., °C. | Time, Hours | Final Acid Number | 70% Solution in Xylene | |
|---|---|---|---|---|---|---|---|---|---|---|
| | | | Weight | | Equivalents ratio | | | | | |
| No. | Weight, g. | Kind | g. | Percent | | | | | Viscosity, cps. | Color, Gardner |
| A-1 | 92.2 | Linseed oil acids | 107.8 | 53.9 | 0.6 | 235 | 2.7 | 0.3 | 1,070 | 15 |
| A-2 | 864 | ___do___ | 1,344 | 60.9 | 0.8 | 230 | 11.0 | 0.8 | 250 | 10 |
| A-3 | 97 | Tall oil acids | 119 | 55 | 0.6 | 240 | 15 | 11.7 | 3,020 | 11 |
| B-1 | 90 | Linseed oil acids | 126 | 58.3 | 0.8 | 240 | 11 | 1.7 | 420 | 9 |
| B-2 | 104 | Dehydrated castor oil acids | 146 | 58.4 | 0.8 | 240 | 4 | 6.8 | 1,390 | 9 |
| C-1 | 140 | Linseed oil acids | 116 | 45.3 | 0.45 | 235 | 4.7 | 0.2 | 1,400 | 14 |
| C-2 | 80 | ___do___ | 141 | 63.8 | 0.95 | 228 | 9.7 | 1.2 | 300 | 12 |
| C-3 | 830 | {Dehydrated Castor oil acids / Soya oil acids} | 462 / 695 | 23.6 / 34.7 | 0.3 / 0.45 | 230 | 12 | 1.2 | 340 | 5 |
| C-4 | 1,200 | {Dehydrated Castor oil acids / Soya oil acids} | 1,002 / 682 | 34.7 / 23.6 | 0.45 / 0.30 | 228 | 8 | 1.2 | 275 | 6 |
| D-1 | 105 | Linseed oil acids | 95 | 47.5 | 0.6 | 235 | 7.8 | 5.0 | 1,410 | 16 |
| D-2 | 100 | ___do___ | 123 | 55.0 | 0.8 | 237 | 19.0 | 3.9 | 260 | 8 |

*Table 2 (part 1)*

| Varnish No. | Air Dried Samples | | | |
|---|---|---|---|---|
| | Tack-free Time, min. | Hardness, Sward or (Pencil) | Effect of 2% NaOH | Effect of Water |
| A-1 | 90 | (2H) | 24 hrs.—opaque, disintegrating | 2 wks.—softer but intact. |
| A-2 | 80 | (2H) | 24 hrs.—cloudy, soft | 2 wks.—clear, not softened. |
| A-3 | 105 | 14 | 24 hrs.—opaque, softer | 2 wks.—softened. |
| B-1 | 100 |  | 4 hrs.—soft, 24 hrs.—peeled off | 2 wks.—clear, strong, tough. |
| B-2 | 75 | (2H) | 24 hrs.—soft, clear |  |
| C-1 |  | 24 | 4 hrs.—weak, disintegrating | 2 wks.—clear, strong. |
| C-2 | 50 | 10 | 4 hrs.—disintegrating | 2 wks.—clear, tough. |
| C-3 | 45 | (2H) | 24 hrs.—opaque softened | 2 wks.—softer, intact. |
| C-4 | 60 | (H) | 24 hrs.—opaque | 2 wks.—softened. |
| D-1 | 75 | 22 | 24 hrs.—weaker, intact | 2 wks.—clear, strong, tough. |
| D-2 | 150 | 16 | 24 hrs.—darker, softer | 2 wks.—soft and weak. |
| I | 65 | 18 | 2 hrs.—disintegrated | Do. |
| II | 65 | 43 | 24 hrs.—cloudy, weak | 1 wk.—hazy strong. |
| III | 65 | 24 | 24 hrs.—very soft and weak | 2 wkt.—soft, clear. |
| IV | 60 | 16 | 3 hrs.—wrinkled, 24 hrs.—disintegrated | Do. |

*Table 2 (part 2)*

| Varnish No. | Baked Samples | | | Percent coating intact after boiling 48 hrs. | Weathering | | |
|---|---|---|---|---|---|---|---|
| | | | | | Percent Reflection | | Percent Gloss Retention |
| | Hardness | Alkali | Water (2 weeks) | | Orig. | (12 mo.) Final | |
| A-1 |  | 1 day—unchanged, 7 days—intact | intact | 100 | 90 | 60 | 67 |
| A-2 | (2H) | 7 days—opaque and soft | opaque, hard, good adhesion. | 5 | 100 | 58 | 58 |
| A-3 |  | 7 days—hazy, soft | hazy, hard | 100 | 92 | 52 | 56.5 |
| B-1 | 8 | 7 days—softened but strong. | hazy, hard, strong | 0 | 94 | 30 | 32 |
| B-2 | (2H) | 3 days—clear | hazy, hard | 0 | 98 | 43 | 43 |
| C-1 | 18 | 7 days—whitened, intact | hazy, tough | 90 | 97 | 60 | 62 |
| C-2 | 8 |  | quite hard and intact | 100 | 100 | 62 | 62 |
| C-3 | (2H) | 1 day—hard, intact, 2 wks.—disintegrating. | unchanged | 0 | 95 | 61 | 64 |
| C-4 | (2H) | 2 wks.—clear, strong, tough. | strong, tough | 100 | 94 | 46 | 48 |
| D-1 | 36 | 7 days—strong, intact | hard, strong | 100 | 95 | 45 | 47 |
| D-2 | 26 | do | hazy, hard, tough | 50 | 97 | 37 | 38 |
| I | 30 | 3 hrs.—disintegrated | hard, tough |  | 90 | 2 | 2 |
| II | 46 | 7 days—clear, hard, tough | do |  | 92 | 5 | 5 |
| III | 36 | 7 days—weak but intact | do |  | 95 | 10 | 10 |
| IV | 16 | 7 days—soft, intact | do |  | 95 | 2 | 2 | to improve the alkali and water resistance, the new compounds compare surprisingly well with the commercial spar varnishes. The unmodified coatings were somewhat inconsistent in resistance to boiling water, but the several perfect coatings obtained, and the superior results found in other tests when the new compounds have been made into enamel formulations, show them to be superior to common resin-in-oil varnishes. The outstanding property shown in the table is gloss retention on prolonged weathering. In this test, the commercial exterior spar varnishes failed to retain any significant gloss. The new compounds containing esterified hydroxyethyl groups were superior to those containing esterified hydroxypropyl groups.

One characteristic for which numerical evaluation is impossible is the flow property of the new coatings. This may be described most accurately by stating that they flow like oils, rather than varnishes, making their application by brushing much easier. Another, and most interesting property of the new coatings distinguishes them from any resin-in-oil varnish. This is their behavior when dried coatings are sand-papered. All prior exterior varnishes tend to roll and clog the sandpaper, whereas coatings of the new esters can be sandpapered easily with no roll-up or clogging. This is because the new coatings, with their chemical homogeneity are of uniform hardness throughout and do not have the usual heterogeneity of hard resin and soft oil blends. The homogeneity of the new synthetic oils may explain in part their surprising freedom from sagging when applied to vertical surfaces, while troublesome sagging is commonly experienced with the prior conventional oleoresinous varnishes when similarly applied.

EXAMPLE 4

Resinous polyalcohols were prepared from a variety of phenol-formaldehyde resins of widely different compositions, using several condensation procedures and several etherification procedures. Each of the polyalcohols was esterified with soya bean oil fatty acids in essentially the same molecular ratio, and the resulting synthetic oils were compared. The phenol-aldehyde condensates used were:

(1) Crude cresol-formaldehyde (U.S. 2,060,410—Ex. 1)
(2) Pure phenol-formaldehyde (U.S. 2,060,410—Ex. 4)
(3) Pure phenol-formaldehyde (Example 1 herein)
(4) p-tert. Butyl phenol-formaldehyde (U.S. 2,610,955—Ex. 11a)
(5) (99% p-tert. Butyl phenol-1% phenol)-formaldehyde.
(6) (97% p-tert. Butyl phenol-3% phenol)-formaldehyde.
(7) (Equal mols p-tert. Butyl phenol and phenol)-formaldehyde.

The phenol-aldehyde condensates were etherified with ethylene oxide, using the following procedures:

(a) No solvent, NaOH catalyst (U.S. 2,060,410—Ex. 3)
(b) Zylene medium, sodium methylate (U.S. 2,610,955—Ex. 1b)
(c) Xylene medium, NaOH catalyst, conditions of Ex. 1 herein.

The reagents are identified and the synthetic drying oils are characterised in Table 3.

Table 3

| Ester No. | Phenol-Aldehyde Resin Used | Etherification Method Used | Esterification | | 70% Solution of Ester in Mineral Spirits | | Drying Time of Films, Hours | |
|---|---|---|---|---|---|---|---|---|
| | | | Time, Hours | Final acid No. | Color (Gardner) | Viscosity at 77° F. (Gardner-Holdt) | Set to touch | Dry hard |
| 1 | 1 | (a) | 2 | 2.5 | 5 | E | 5 | >24 |
| 2 | 2 | (a) | 2 | 2.4 | 11 | V | 3.5 | 8-9 |
| 3 | 2 | (b) | 1.5 | 8.2 | 5 | F | 5 | 8-9 |
| 4 | 3 | (c) | 2 | 2.0 | 4 | W | 1-2 | 7-8 |
| 5 | 4 | (b) | 3 | 9.3 | 13-14 | A | 3 | 8 |
| 6 | 4 | (c) | 4 | 9.8 | 8 | B | 3 | 8 |
| 7 | 5 | (b) | 3 | 9.6 | 8-9 | A | 5 | 8-9 |
| 8 | 5 | (c) | 4 | 8.9 | 5 | A | 5 | 8-9 |
| 9 | 6 | (b) | 17 | 1.8 | 9 | B | 4.5 | 8-9 |
| 10 | 6 | (c) | 21 | 13 | 11 | B | 4.5 | 8-9 |
| 11 | 7 | (b) | 6 | 9.9 | 6 | M | 3.5 | 7.5 |
| 12 | 7 | (c) | 2.5 | 9.4 | 5-6 | G | 3 | 7 |

It is observed that esters numbered 2, 3, 4, 11 and 12 in the foregoing table are the only ones conforming to the present invention. The cresol-aldehyde product (1) is of low molecular weight and is slow drying. The tertiary-butyl phenol products (5 and 6) have too low viscosity. This, coupled with their high cost, in the absence of outstandingly better color, renders them less desirable than those of this invention. The same remarks and criticisms apply to the tertiary butyl phenol products containing from 1 to 3 percent of phenol (esters 7–10). The esters (11–12) made with equimolar ratios of phenol and butyl phenol in the original novolak have significantly higher viscosities and shorter drying times than those made from alkyl phenols alone. Ester No. 4 has an outstanding combination of properties.

EXAMPLE 5

The resinous polyalcohol whose preparation is described in Example 2, above, was esterified with linseed oil fatty acids and with mixtures in varying proportions of such acids and commercial dimeric drying oil acids. The dibasic dimer acids caused a very significant increase in the viscosity of the final esterified product, without, however, causing gels to form when less than 0.25 equivalent of dimer acid was used. A typical series of such products is reported in Table 4.

Table 4

| Acids Used | | Final acid Number of Cook | Viscosity of solution in aliphatic naphtha | |
|---|---|---|---|---|
| Linseed oil acids, Equivalents | Dimer acids, Equivalents | | Concentration, percent by volume | Gardner-Holdt Viscosity |
| 0.9 | none | 7.5 | 70 | A |
| 0.63 | 0.27 | 16.5 | gelled | |
| 0.675 | 0.225 | 9.8 | 60 | W |
| 0.72 | 0.18 | 9.9 | 60 | F |
| 0.765 | 0.135 | 6.5 | 60 | D |

These varnishes gave good air dried or baked finishes with improved alkali and water resistance.

EXAMPLE 6

In a similar manner to that reported in Example 5, a series of esters was made from the same polyalcohol, esterified with soya fatty acids alone and in various combinations with phthalic anhydride. These products are reported in Table 5.

Table 5

| Acids Used | | Final Acid Number of Cook | Viscosity in Xylene | |
|---|---|---|---|---|
| Soya acids, Equivalents | Phthalic anhydride, Equivalents | | Concentration, percent by volume | Gardner-Holdt Viscosity |
| 0.9 | none | 7 | 70 | gelled |
| 0.45 | 0.45 | 20 | | B |
| 0.54 | 0.36 | 9.8 | 40 | F |
| 0.585 | 0.315 | 10.0 | 50 | C |

These esters, when applied as coatings containing cobalt and calcium driers, were dry to touch in 30 to 60 minutes and were hard in 8 hours. Baked films had excellent flexibility and adherence, and the various films of these compositions were substantially unchanged in appearance after 800 hours in a Fadeometer. They were highly resistant to attack by greases, oils, organic acids, and aliphatic hydrocarbons, and the baked coatings were resistant to attack by 3 percent aqueous alkali in immersion tests of over one month duration.

EXAMPLE 7

The ester formed by cooking together 52 parts by weight of the resinous polyalcohol of Example 2 and 48 parts by weight of dehydrated castor oil fatty acids had a Gardner-Holdt viscosity of Z-6 when dissolved to form a 70 percent solution in mineral spirits. A commercial urea-formaldehyde thermosetting resin ("Uformite" MM-55) was cooked into the ester to form a blend of 70 percent ester and 30 percent resin. This blend was pigmented with 25 percent of its weight of a mixture of 97.5 percent titanium dioxide and 2.5 percent lampblack. The pigmneted composition was thinned to 20 seconds viscosity (No. 4 Ford cup) with a 1:1 volume mixture of xylene and butanol. The resulting composition was deposited at 1 mil thickness on "Bonderized" steel sheet, and was baked 30 minutes at 350° F. The resulting primer coat was hard and tough, remaining adherent when the coated sheet was bent around a mandrel ⅛ inch in diameter. When exposed to 1 percent aqueous solution of laundry detergent at 160° F. the coating remained intact at 24 hours and had a few scattered small blisters after 40 hours. Failure occurred at 60 hours. The coating was a superior primer coat for the enamel on steel washing machine bodies and other laundry equipment, and, like coatings from which the lampblack was omitted were useful prime coats for steel articles such as refrigerators. These and related metal primer compositions are the subject of a concurrently filed application of R. B. Drubel, Serial No. 469,017, now abandoned.

EXAMPLE 8

A resinous polyalcohol prepared in the manner described in Example 1, and having a hydroxyl equivalent weight of 150, was divided into small lots, each of which was cooked with a different ratio of soya fatty acids. Samples in which 0.95, 0.90, 0.70 and 0.50 mol of the acid were used for each 150 grams of polyalcohol were all air-drying, brushing type vehicles, soluble in mineral spirits. Those in which 0.30, 0.18 and 0.107 mol of acid were reacted with 150 grams of polyalcohol were not soluble in mineral spirits but were soluble in 1:1 volume mixtures of xylene and butanol, and these vehicles were good baking coatings, useful either as primers or as baked top coats.

EXAMPLE 9

This example illustrates some of the variations in the principal properties of the drying oil acid esters of a resinous polyalcohol with varying amounts and kinds of esterifying acids. In each case, the polyalcohol employed was the reaction product of a novolak, from common phenol and formaldehyde, with 1.05 times the stoichiometric amount of ethylene oxide to etherify the phenolic hydroxyls. The polyalcohol had a molecular weight of about 920 and an equivalent weight of 151 per alcoholic hydroxyl. Its melting point was 61° C., specific gravity 1.297, refractive index at 20° C. 1.604, and color, when dissolved to form a 50 percent solution in propylene glycol monomethyl ether, 5–6 on the Gardner color scale. The polyalcohol was insoluble in hydrocarbon solvents. The comparison of the esters is made in Table 6. In addition to the listed properties, all of the air dried and all of the baked films had excellent clarity, and all films baked on a metal strip adhered without any evidence of cracking when the coated strip was bent around a mandrel 0.125 inch in diameter. Of the several esters reported, those of the dehydrated castor oil acids have an outstanding combination of desirable properties, though all of the esters are useful and each has numerous fields of application.

Table 6 (part 1)

| Acids Used | Linseed | | | Soybean | | |
|---|---|---|---|---|---|---|
| Percent of Theoretical | 50 | 70 | 90 | 50 | 70 | 90. |
| Esterification, hours at 240° C | 2.0 | 2.0 | 2.0 | 2.0 | 2.0 | 2.0 |
| Acid No | 1.0 | 1.0 | 1.0 | 1.0 | 1.0 | 1.0 |
| Viscosity (Gardner): | | | | | | |
| 80% in Mineral spirits | | | P | | | Q. |
| 70% in Mineral spirits | Z-3 | P | | Z-4 | K | |
| 60% in Mineral spirits | | | | | | |
| Color (Gardner) of 70% solution | 5 | 3 | 5 | 3 | 1-2 | 4. |
| Dry to touch, hours (Pb-Co driers) | 5 | 3 | 5 | 1 | 1 | 1.5 |
| Dry hard, hours | 1 | 1 | 1 | 1 | 1 | 10. |
| Sward Hardness (2.0 mil film): | 7 | 8 | 9 | 7 | 9 | |
| 8 hours | 13% | 13% | 9% | 19 | 7.4 | 3.7. |
| 24 hours | 24% | 19% | 12% | 22 | 11 | 7. |
| 3 days | 30% | 22% | 17% | 22 | 13 | 7. |
| 7 days | 33% | 26% | 19% | | | 9. |
| Impact resistance, baked film, inch pounds to failure | 28 | 28 | 28 | 28 | 28 | 28. |
| Abrasion resistance (weight loss, 300 revolutions)[1] | 0.045 | 0.030 | 0.045 | .065 | .052 | .061. |
| Alkali resistance, time to failure: | | | | | | |
| 1% NaOH | 7 days | 15 days | 11 days | 6 days | 11 days | 5 days. |
| 5% NaOH | 20 hours | 48 hours | 20 hours | 15 hours | 23 hours | 4 hours. |
| Solvent resistance, 30 min. exposure: | | | | | | |
| Mineral spirits | soft | soft | v. soft | soft | v. soft | v. soft. |
| Leaded gasoline | v. sl. softening | v. slight | v. soft | v. soft | v. soft | v. soft. |
| Xylene | v. soft | v. soft | v. soft | v. soft | v. soft | v. soft. |
| Cold water resistance, Time to regain clarity after 13 days immersion | 20 min | 10 min | 20 min | 15 min | 10 min | 20 min. |

[1] Grams loss, on Taber Abraser, using CS-17 abrasive.

Table 6 (part 2)

| Acids Used | Dehydrated Castor | | | Tall Oil | | |
|---|---|---|---|---|---|---|
| Percent of Theoretical | 50 | 70 | 90 | 50 | 70 | 90. |
| Esterification, hours at 240° C | 2.0 | 2.0 | 2.0 | 2.0 | 2.0 | 2.0. |
| Acid No | 1.0 | 1.0 | 1.0 | 19.7 | 25.8 | 31.5. |
| Viscosity (Gardner): | | | | | | |
| 80% in Mineral spirits | | | X | | | X. |
| 70% in Mineral spirits | | | | | X | |
| 60% in Mineral spirits | Z-6 | W | | Z-4 | | |
| Color (Gardner) of 70% solution | 2 | 2 | 2 | 4 | 5 | 6. |
| Dry to touch, hours (Pb-Co driers) | 0.5 | 1 | 1 | 2.5 | 3 | 3. |
| Dry hard, hours | 7 | 7.5 | 9 | 7 | 10 | 12. |
| Sward Hardness (2.0 mil film): | | | | | | |
| 8 hours | 13 | 9.3 | 9.3 | 13 | 9.3 | 5.6. |
| 24 hours | 26 | 17 | 13 | 20 | 18 | 15. |
| 3 days | 30 | 22 | 15 | 40 | 26 | 17. |
| 7 days | 33 | 24 | 15 | 40 | 26 | 20. |
| Impact resistance, baked film, inch pounds to failure | 28 | 28 | 28 | 12 | 18 | 28. |
| Abrasion resistance (v eight loss, 300 revolutions)¹ | .022 | .026 | .039 | .058 | .060 | .063. |
| Alkali resistance, time to failure: | | | | | | |
| 1% NaOH | 21 days | 19 days | 12 days | 7 days | 4 days | 4 days. |
| 5% NaOH | 48 hours | 48 hours | 24 hours | 4 hours | 4 hours | 4 hours. |
| Solvent resistance, 30 min. exposure: | | | | | | |
| Mineral spirits | v. slight | v. slight | soft | soft | soft | soft. |
| Leaded gasoline | v. soft | v. soft | v. soft | v. soft | v soft | v. soft. |
| Xylene | v. soft | v. soft | v. soft | v. soft | soft | soft. |
| Cold water resistance, Time to regain clarity after 13 days immersion | 30 min | 25 min | 30 min | 25 min | 25 min | 25 min. |

¹ Grams loss, on Taber Abraser, using CS-17 abrasive.

EXAMPLE 10

A series of esters was made from the same polyalcohol as was employed in Example 9. In this case there was used each of several proportions of linseed oil fatty acids and rosin acids. In from 3 to 4 hours at 240° C., the acid value of the reaction mixture was in the range from 12 to 25. Solutions of 70 percent concentration in aliphatic naphthas had Gardner-Holdt viscosities from J to Z-2, and Gardner color ratings near 10. When mixed with lead and cobalt driers, the deposited films were dry to touch in from 1.5 to 3 hours and were hard in 5 to 8 hours. Sward hardness values of the films ranged up to 47.5 percent. Alkali and water resistance values were high, but the films are damaged by prolonged exposure to gasoline or to xylene.

EXAMPLE 11

The soya fatty acid ester of the polyalcohol of Example 9, in which 0.7 mol of acid was used for each equivalent weight of the polyalcohol, was mixed with small amounts of monomeric vinyl toluene until there was obtained a ratio of 70 volumes of ester and 30 volubes of vinyl toluene. Di-tertiarybutyl peroxide was introduced with the vinyl toluene, as a polymerization catalyst, in amount of 3 percent of the weight of vinyl toluene. The mixture was held at reflux temperature until a cooled sample, dissolved to form a 60 percent solution in mineral spirits, had a Gardner-Holdt viscosity of V. The Gardner color rating of this solution was 6. When mixed with lead and cobalt driers in the conventional manner, the vehicle was spread as a coating which was dry to touch in one hour and was hard in 2.5 hours. The dry film, 7 days old, had a Sward hardness of 25 percent. A film which had been baked 30 minutes at 250° F. ruptured in 1 percent sodium hydroxide solution after 15 days, and another such film withstood 5 percent sodium hydroxide solution for 4 days. Another such film withstood 8 hours' exposure to boiling water, without becoming cloudy or discolored, before breaking.

I claim:

1. An esterification product of (1) the oxyalkylated reaction product of (a) a phenol-formaldehyde novolak in which there are 4 to 10 phenolic hydroxyls per molecule, substantially all of the phenolic constituents of the condensate being the trifunctional phenol, $C_6H_5OH$, with (b) from 0.85 to 1.2 mols for each phenolic nucleus of at least one compound from the group consisting of ethylene oxide and propylene oxide, said oxyalkylated product being one which is insoluble in aromatic hydrocarbons, and (2) carobxylic acids in amount to provide from 0.35 to 0.9 carboxyl group per alcoholic hydroxyl of the said oxyalkylated product, at least 60 percent of the carboxyl groups being furnished by fatty acids having drying characteristics.

2. An esterification product as claimed in claim 1, wherein the novolak is oxyalkylated with ethylene oxide.

3. An esterification product as claimed in claim 1, wherein essentially all of the esterifying acids have drying characteristics.

4. An esterification product as claimed in claim 1, wherein not to exceed 40 percent of the carboxyl groups are furnished by dimeric drying fatty acids.

References Cited in the file of this patent

UNITED STATES PATENTS

| 2,060,410 | Balle | Nov. 10, 1936 |
| 2,499,365 | De Groote | Mar. 7, 1950 |
| 2,610,955 | De Groote | Sept. 16, 1952 |
| 2,649,422 | Aelony | Aug. 18, 1952 |
| 2,695,894 | D'Alelio | Nov. 30, 1954 |

FOREIGN PATENTS

| 630,647 | Great Britain | Oct. 18, 1949 |

OTHER REFERENCES

Ellis: The Chemistry of Synthetic Resins, pages 412–3, Reinhold (1935).

Brody: Organic Finishing, pages 8–11, vol. 14, (September 1953).